June 10, 1924.                                                              1,496,987
G. D. HUGO
VEHICLE FRONT WHEEL BRAKE
Filed May 7, 1923
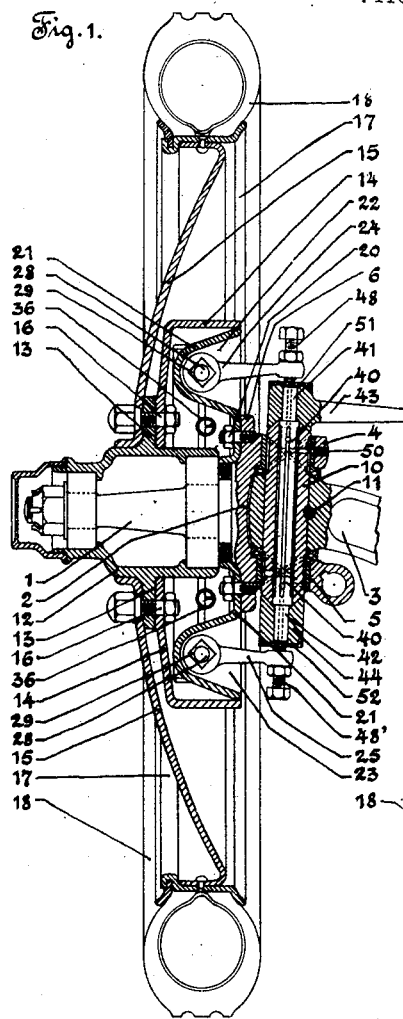
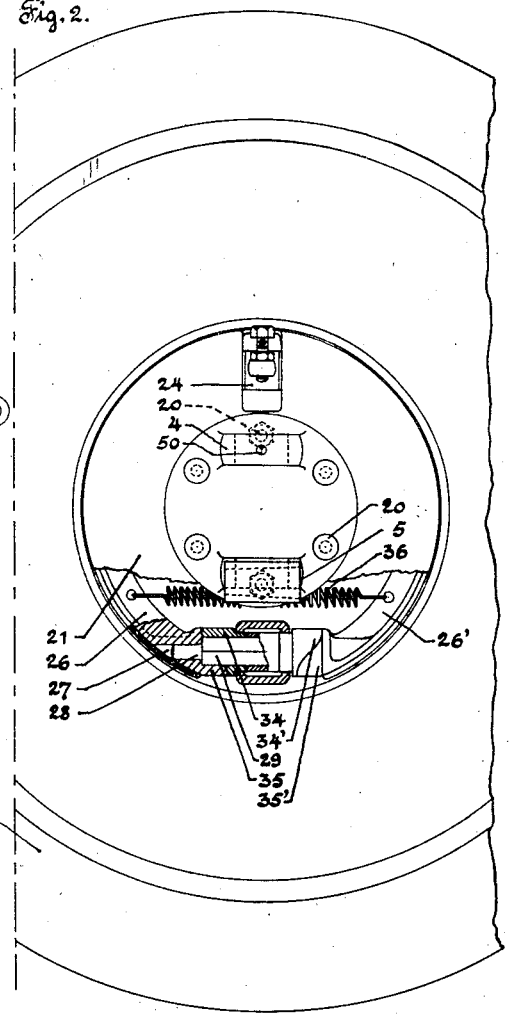
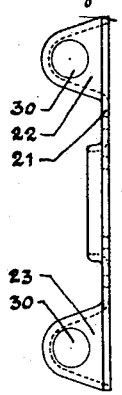
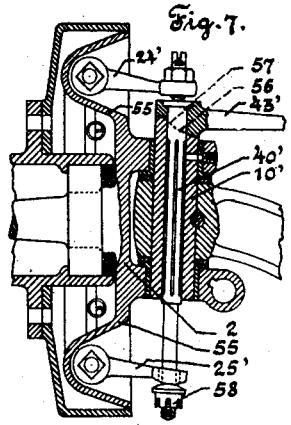
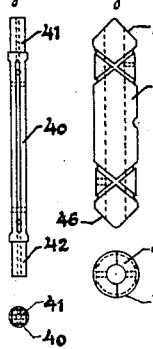
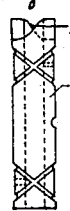
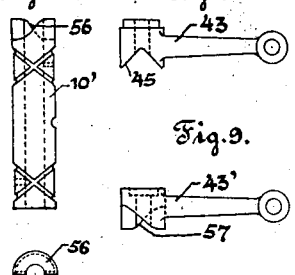
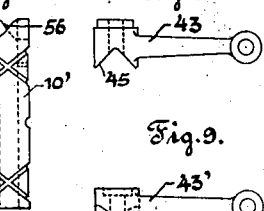
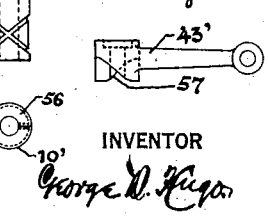
INVENTOR
George D. Hugo Patented June 10, 1924.

1,496,987

UNITED STATES PATENT OFFICE.

GEORGE D. HUGO, OF SEATTLE, WASHINGTON.

VEHICLE FRONT-WHEEL BRAKE.

Application filed May 7, 1923. Serial No. 637,264.

*To all whom it may concern:*

Be it known that I, GEORGE D. HUGO, a citizen of the United States, and a resident of the city of Seattle, county of King, State of Washington, have invented certain new and useful Improvements in Vehicle Front-Wheel Brakes, of which the following is a specification.

This invention relates to improvements in vehicle braking mechanisms, and more particularly to braking mechanism for the front or steering wheels of automobiles, trucks, trailers and other vehicles that use the knuckle type of axles for mounting such wheels.

The principal object of this invention is to provide braking mechanism for the steering wheels of motor vehicles of the above character, that may be actuated at any time regardless of the position assumed by the wheels in steering.

A further object of the invention resides in the provision of braking mechanism in such associated relation with the pivoted wheel supporting knuckles, that steering movement of the knuckles has no effect on the braking action or relative position of the parts of the braking mechanism.

Another object resides in the provision of braking mechanism embodying floating type brake shoes and with double action braking means.

Other objects reside in the various details of construction of the parts, whereby assembling or disassembling is facilitated, whereby construction costs are reduced to a minimum and whereby a brake assembly, that is durable, reliable and of great efficiency, is provided.

In accomplishing these and other objects of the invention, I have provided the improved details of construction, the preferred forms of which are illustrated in the accompanying drawings, wherein:

Figure 1 is a vertical, sectional view centrally through a wheel equipped with braking mechanism in accordance with the present invention.

Figure 2 is an inside elevation of the wheel, the knuckle, the brake drum, and braking members; parts being broken away for better illustration.

Figure 3 is an edge view of the brake drum cover used in the preferred form of construction.

Figure 4 shows the cam actuating shaft in elevation and in end view.

Figure 5 shows the steering knuckle pin in elevation and in end view.

Figure 6 is a side view of the cam lever of the preferred construction.

Figure 7 is a vertical section of an alternative construction.

Figure 8 is a side and an end view of a steering knuckle pin for the alternative construction.

Figure 9 is a cam lever used in the alternative construction.

The present invention relates particularly to braking mechanism of that type of construction adapted for use in connection with the front, or steering, wheels of automobiles and similar vehicles, wherein each steering wheel is mounted rotatably on a spindle 1 that is extended horizontally from and which forms a part of a steering knuckle 2 that is pivotally mounted at one end of the axle 3; the said knuckle being provided also with upper and lower bosses 4 and 5 respectively, extending inwardly from an annular flange 6, formed about the base of the spindle 1 and upon which the brake drum is mounted, as will presently be described.

The bosses 4 and 5 have vertically directed openings therethrough that register with an opening through the end of the axle, and through these openings a tubular steering knuckle pin 10 is extended to pivotally support the knuckle on the axle; this pin being fixed within the axle against longitudinal movement or rotation by means of a key or pin 11 that extends in interlocking relation through the parts.

The wheel, which is herein illustrated, comprises a hub portion 12 provided with an annular flange 13 to which, on inner and outer faces respectively, are secured an inwardly opening brake drum 14 and a wheel body disk 15; the securing means consisting of a plurality of bolts 16 extended through these parts. The body disk 15 supports a rim 17, whereon a tire 18 is mounted. This particular construction has been illustrated because it is best suited to a brake assembly of the present type, but it is to be understood, that the braking mechanism can be applied to wheels of spoke, disk or other types of construction with satisfactory results.

Fitted about the spindle 1 and against the outer face of the steering knuckle flange 6, to which it is secured by means of a plurality of rivets, or studs 20, is the drum cover plate 21, which is provided adjacent its upper and lower edges, as is best shown in Figure 1, with inwardly depressed pockets 22 and 23 wherein the inner ends of upper and lower vertically movable brake actuating arms 24 and 25 are disposed for pivotal movement.

Located within the drum 14 at opposite sides of the spindle are brake shoes 26—26' provided at upper and lower ends with inwardly opening sockets 27, see Figure 2, wherein the rounded ends 28 of squared cam operating shafts 29 are slidably contained; the said shafts being extended horizontally through openings 30 in the opposite side walls of pockets 22 and 23 and within the pockets have the actuating arms 24 and 25 mounted thereon. Slidably fitted on the shafts 29, at the outer sides of the pockets are cams 34—34' engaging with cams 35—35' formed on the ends of the brake shoes; the cam arrangement being such that upward and downward movement of the arms 24 and 25 respectively will effect expanding movement of the brake shoes against the drum. The brake shoes 26—26' are connected by springs 36, whereby they are normally held disengaged from the drum and whereby the cam surfaces are held coincident.

By mounting the expanding cams slidably on shafts 29, an automatic balancing, or equalization, of braking forces is provided for, since this permits a reaction of the braking forces from one shoe to the other. It also provides for horizontal expanding movement of the shoes, whereby their entire braking surfaces are brought simultaneously into perfect contact with the drum surface, thereby insuring even wear at all points.

Contained within the tubular steering knuckle pin 10 is a floating, cam actuating shaft 40, having squared upper and lower ends 41 and 42 extended beyond the ends of pin 10. Slidably mounted on these squared ends, respectively is a brake operating cam lever 43 and a cam 44 having surfaces that are coincident with cam surfaces 45—46, see Figure 5, formed at the opposite ends of the knuckle pin. The lever 43 may be connected with any suitable brake actuating mechanism, not shown, whereby it may be moved rotatably on its support to thereby rotate the shaft 40 and effect a rising movement of the cam lever 43 and a downward movement of cam 44 incident to their adjustment on the cam surfaces at the ends of the knuckle pin 10.

The vertically swinging ends of the brake arms 24 and 25 extend to points substantially in the axial line of the knuckle pin, and have adjusting bolts, or screws 48—48' mounted therein and extended into engagement with the upper and lower surfaces respectively of the cam lever 43 and cam 44, so that the displacement of these cams upon actuation of the cam lever 43 will cause a swinging movement of the arms 24 and 25, whereby the shafts 29 are rotated and the brake shoes are moved into braking contact with the drum. The adjusting bolts 48—48' provide for the taking up of wear of the braking surfaces, so that the braking action will take immediate effect and any lost motion between the cam lever and braking members may be eliminated.

For purposes of lubrication, the boss 4 is provided with an opening 50 in registration with a hole through the pin 10 and the shaft 40 is grooved or flattened longitudinally so that the lubricant will be distributed to its opposite ends and to the cam surfaces. The cams are provided with cover plates 51—52, whereby the lubricant is retained, and which serve also as bearing plates, against which the adjusting screws 48—48' of the brake arms rest. The pin 10 is also grooved exteriorly to receive and distribute the lubricant for its bearing surfaces within the bosses 4 and 5.

In Figure 7 I have illustrated an alternative construction, wherein the brake drum is equipped with a cover plate 55 that is formed integral with a knuckle 2, and wherein the brake shoes, which may be of the character previously described, are expanded by upward swinging movement of both of the actuating arms 24' and 25'.

In this construction the knuckle pin is pivotally supported on a tubular steering knuckle pin 10' that is fixed within the axle and which is provided at its upper end only with a cam surface 56. An actuating shaft 40' extends slidably through the knuckle pin 10' and at its upper end has a cam lever 43' mounted thereon; said lever having a cam surface 57 coincident with cam surface 56, whereby, movement of the lever by a connection with a brake actuating means, not shown, will cause the shaft 40' to be raised. The outer end of arm 24' engages with the upper end of a shaft 40' and the arm 25' has an opening through which the lower end of the shaft extends and at its end is seated against a nut 58 threaded adjustably on the shaft. Upward movement of the shaft 40' causes upward swinging of the brake arms 24'—25' and the actuation of the brake shoes into braking contact with the drum.

With the braking mechanism so constructed and assembled, it is readily apparent that, since the only points of connection, or contact, of the braking parts carried by the knuckle and the actuating means carried by the axle, lie within the axial line of the steering knuckle pin and its contained shaft, and are not fixed connections, steering movement of the wheels will not change the relative location of braking members, and they can be actuated regardless of the position of the wheel in steering.

It is also apparent that the double brake actuating means makes possible the use of floating type of shoes, whereby equalization of the braking forces is automatically maintained, and whereby the shoes may be moved so that their entire braking surfaces will be brought into braking contact with the drum with an equal pressure at all points.

Having thus described my invention, what I claim as new therein and desire to secure by Letters Patent is:

1. The combination with an axle, a steering knuckle, a wheel rotatably mounted by the knuckle having a brake drum thereon and braking members carried by the knuckle in co-operative relation with the drum, of a member fixed in the axle to pivotally support the knuckle and having a cam surface, a brake operating member disposed upon said cam surface, an actuating arm operatively connected with the braking members and engaging said brake operating member and operable incidental to movement of the brake operating member with respect to the cam surface.

2. The combination with an axle, a steering knuckle, a wheel rotatably mounted by the knuckle having a brake drum thereon and braking members supported from the knuckle in co-operative relation with the drum, of a knuckle mounting member fixed in the axle having an end provided with a cam surface, an actuating arm operatively connected with said braking members and extended within the axial line of the knuckle mounting member and a brake actuating lever mounted for pivotal movement upon said cam surface whereby such movement effects functional movement of the brake arm.

3. The combination with a fixed axle, a steering knuckle with its associated spindle, a wheel hub mounted on the spindle, a brake drum rotatable with the hub and braking members carried by the knuckle, of a tubular pin fixed within the axle and pivotally supporting the knuckle and having a cam surface at one end, a shaft within said pin and extending from the end thereof, a cam lever mounted on said shaft and having a cam surface coincident with the cam surface of the pin, and a brake actuating arm operatively connected with the braking members and adapted to be actuated by rising movement of the cam lever incident to its adjustment relative to the fixed cam.

4. The combination with a fixed axle, a steering knuckle with its associated spindle, a wheel hub mounted on the spindle, a brake drum rotatable with the hub and braking members carried by the knuckle, of a tubular pin fixed within the axle and pivotally supporting the knuckle, cams formed at the ends of said tubular pin, a shaft contained within the pin and extended from the ends thereof, cams slidably mounted on the ends of said shaft coincident with the cams at the ends of the pin; one of said cams having an actuating lever and brake actuating arms operatively connected with the braking members and operable by rising movement of the cams incident to their rotative movement, relative to the fixed cams, by adjustment of the cam actuating lever.

5. The combination with an axle, a steering knuckle with its associated spindle, a wheel hub mounted on the spindle, a brake drum rotatable with the hub and braking shoes supported from the knuckle, of a tubular knuckle mounting pin fixed within the axle and having cams at its opposite ends, a floating shaft contained within the tubular pin and having squared ends extended from the ends of the pin, cams slidably mounted on said squared ends and coincident with the cams at the ends of the knuckle pin, an actuating lever for moving said shaft to cause a rising movement of the cams on the squared ends thereof, and actuating arms for the brake shoes extended into position to be engaged and actuated by the rising movement of said cams.

6. The combination with an axle, a pivotally mounted steering knuckle with its associated spindle, a wheel hub rotatable on the spindle, a brake drum on the hub, a drum cover plate fixed to the knuckle and paired brake shoes supported from the cover plate at opposite sides of the spindle within the drum, of a pair of brake actuating arms pivotally mounted in the cover plate and extended inwardly to swing in a vertical plane perpendicular to the plane of the drum cover, a pin pivotally mounting the knuckle having cams at its ends, movable cams coincident with the first named cams, and having operative connection with said brake actuating arms, and means for rotating the movable cams to effect actuation of said brake arms.

7. The combination with a fixed axle, a steering knuckle with its associated spindle, a wheel hub mounted on the spindle, a brake drum rotatable with the hub and braking members carried by the knuckle, of a tubular pin fixed within the axle and pivotally supporting the knuckle, cams formed at the ends of said tubular pin, a shaft contained within the pin and extended from the ends thereof, cams slidably mounted at the ends of said shaft coincident with the cams at the ends of the pin; means for rotating said shaft to effect rotation of said cams, brake actuating arms operatively connected with the braking members and operable by rising movement of the cams incident to their rotative movement relative to the fixed cams, by adjustment of the cam actuating means and an adjustable connection between said slidable mounted cams and the brake actuating arms.

8. The combination with an axle, a steering knuckle with its associated spindle, a wheel hub mounted on the spindle, a brake drum rotatable with the hub and braking shoes supported from the knuckle, of a tubular knuckle mounting pin fixed within the axle and having cams at its opposite ends, a floating shaft contained within the tubular pin and having squared ends extended from the ends of the pin, cams slidably mounted on said squared ends and coincident with the cams at the ends of the knuckle pin, an actuating lever for moving said shaft to cause a rising movement of the cams on the squared ends thereof, and swingingly movable actuating arms for the brake shoes extended into alinement with the knuckle pin and adjusting bolts threaded through the ends of said arms and engaging the movable cams, whereby rising movement of the cams will actuate said arms.

Signed at Seattle, Wash., this 17 day of April 1923.

GEORGE D. HUGO.